July 16, 1929.          G. L. SCHNABLE          1,720,749
INSULATING MATERIAL
Filed June 27, 1925
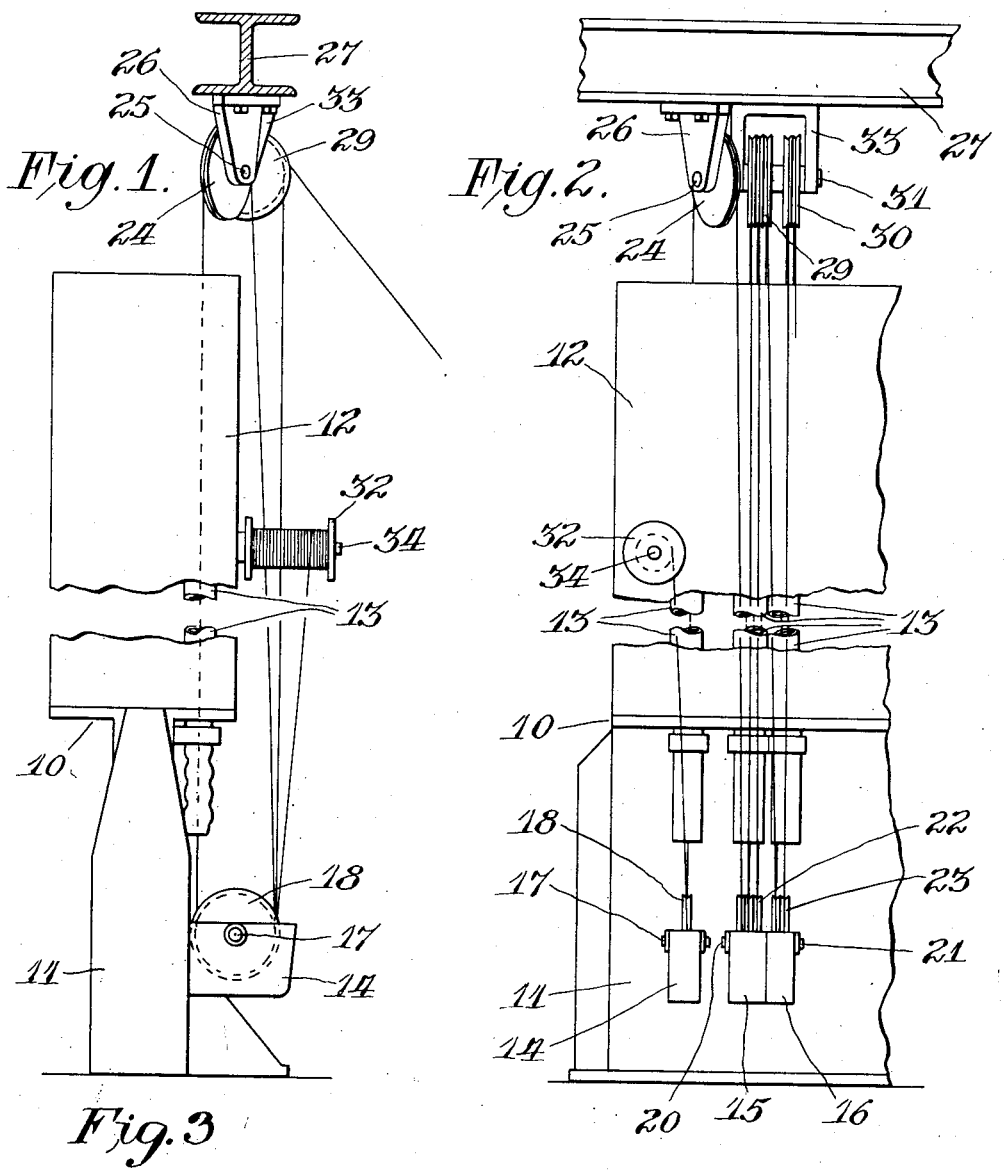
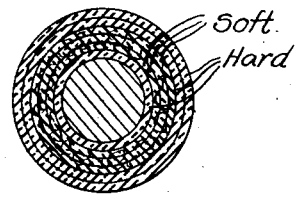
Inventor.
George Leroy Schnable,
By  A.H. Tatum
          Atty.

Patented July 16, 1929.

1,720,749

UNITED STATES PATENT OFFICE.

GEORGE LEROY SCHNABLE, OF RIVERSIDE, ILLINOIS, ASSIGNOR TO WESTERN ELECTRIC COMPANY, INCORPORATED, OF NEW YORK, N. Y., A CORPORATION OF NEW YORK.

INSULATING MATERIAL.

Application filed June 27, 1925. Serial No. 39,892.

This invention relates to improvements in insulating materials and more particularly to an improved laminated insulation for electrical conductors.

In winding electric coils of wire having baked or otherwise hardened insulating coatings, difficulty is sometimes encountered due to short circuits which render the coils defective. In some cases it has been found that such short circuits were caused by defects or ruptures in the insulation, which ruptures were sometimes produced during the winding operation and due to insufficient adherence between the insulation and the wire or to the inability of the insulation to resist the abrasion caused by one wire being wound diagonally over and pressed against another.

The object of the present invention is to provide an improved, economical, flexible and durable insulation for electrical conductors which possesses high insulating properties, is adherent to the surface of conductors and resistant to abrasion.

An insulation embodying the features of the invention comprises a plurality of laminations of materials possessing substantially different physical and electrical characteristics which characteristics may be either inherent in the materials or may result from treating them under different conditions. One lamination may be composed of an inherently hard and durable material which is resistant to abrasion, another lamination may be composed of a relatively softer material possessing high insulating properties and which may not necessarily be resistant to abrasion, while still another lamination may be composed of a material which is very adherent to the surface of conductors.

A preferred laminated insulation for electrical conductors used in the manufacture of electric coils made in accordance with the present invention comprises a lamination adjacent to the conductor of a material which is very adherent to the surface of the conductor, a lamination superimposed thereon of a soft and flexible material possessing high electrical insulating properties and adherent to the first lamination and an outer lamination of a relatively harder and durable material which is resistant to abrasion and adherent to the intermediate lamination of soft material. A composition which is particularly suitable for the first lamination because of its good adherence to the surface of the conductor is fully disclosed and claimed in the copending application of S. M. Hull, Serial No. 664,081, filed September 21, 1923, which composition consists essentially of a cellulose derivative, such as cellulose acetate, brought into solution with a synthetic resin by means of a suitable solvent, such as furfural. This composition is also particularly suitable for the outer lamination because of its inherent hardness and durability which render it resistant to abrasion. The intermediate lamination may be composed of a suitable number of coatings of any soft insulating composition which need not necessarily be especially adherent to the conductor but should be adherent to the first lamination of insulating material. An insulating composition which is particularly suitable for the intermediate lamination because of its inherent softness, flexibility and good insulating qualities comprises substantially, a solid hydrocarbon such as ozocerite and a non-drying vegetable oil, preferably castor oil. Such an insulating composition is fully disclosed and claimed in Patent No. 1,101,281, granted to Holmes et al., June 23, 1914.

In the accompanying drawing,

Fig. 1 illustrates, schematically, a side elevation of a strand coating apparatus by which the invention may be practiced, Fig. 2 is a front elevation thereof, and Fig. 3 is an enlarged cross-sectional view of a conductor with a laminated insulating covering embodying the invention applied thereto.

Referring now to the drawing in detail, 10 indicates, generally, a wire coating machine, schematically illustrated, of the type disclosed in Patent No. 1,303,700, granted to F. S. Kochendorfer and H. Blount, May 6, 1919. Although the insulation embody the features of the invention may be produced to advantage by the use of this apparatus, it should be understood that the invention is not to be limited thereto but is limited only by the scope of the appended claims.

The machine illustrated herein is particularly designed for applying and baking a plurality of insulating coatings upon an electrical conductor and comprises essentially a framework 11 which supports an oven 12 within which are disposed a plurality of heated tubes 13. The insulating materials are disposed within receptacles 14, 15 and 16 (Fig. 2) which are secured to the framework 11 near the bottom thereof. Revolvably mounted upon a stud shaft 17 suitably secured to the side wall of the receptacle 14 is a sheave 18 which is so disposed within the receptacle that a portion of its peripheral surface is constantly submerged within the material contained therein. Similarly mounted upon stud shafts 20 and 21 suitably secured to the side walls of the receptacles 15 and 16, respectively, are a plurality of sets of sheaves 22 and 23, respectively. Disposed above the oven 12 and substantially in alignment with the sheave 18 is a sheave 24 which is rotatably mounted upon a shaft 25 carried by a suitable bracket 26 which is attached to any suitable support, such as an I-beam 27. Similarly disposed above the oven 12 and substantially in alignment with the sets of sheaves 22 and 23 are sets of sheaves 29 and 30, respectively, which are rotatably mounted upon the shaft 31 carried by a bracket 33 secured to the I-beam 27. A spool 32 carrying a supply of wire to be coated is rotatably mounted upon a horizontal stud 34 projecting outside of the wall of the oven 12.

In the operation of the apparatus above described, the receptacles 14, 15 and 16 are filled to a suitable height with insulating compositions for forming the first, second and third laminations, respectively. The wire from the supply spool 32 is threaded around the sheave 18, then upwardly through the first heated tube 13, over the sheave 24 positioned at the top of the machine, thence down the front part of the machine around the first of the sheaves 22 submerged in the receptacle 15, upwardly through the second heated tube 13, around the first of the sheaves 29 positioned at the top of the machine, down the front side of the machine and around the second of the sheaves 22 and back and forth between the sheaves 22 and 29 until the desired number of coatings of the composition contained in the receptacle 15 are applied and baked thereon. Upon leaving the last of the sheaves 29, the wire passes down the front side of the machine and around the first of the sheaves 23 submerged in the receptacle 16 and then upwardly through the third heated tube 13, over the first of the sheaves 30 positioned at the top of the machine and back and forth between the remaining sheaves 23 and 30 until the desired number of coatings of the composition contained in the receptacle 15 have been applied thereto. Each of the coatings is baked to the desired degree of hardness while it passes through the associated heated tube. Any suitable drawing and reeling mechanism (not shown) may be employed to draw the wire from the supply spool through the coating apparatus and take up the completely insulated wire as it leaves the last sheave 30.

In this embodiment of the invention the insulating composition disposed in the receptacles 14 and 16 comprises a solution of cellulose acetate, phenolic resin and furfural, such as is fully disclosed and claimed in the aforementioned patent application. A relatively softer insulating composition possessing good insulating qualities, preferably a composition of a solid hydrocarbon such as ozocerite and a non-drying vegetable oil such as castor oil is contained in the receptacle 15. A coating of the composition contained in the receptacle 14 is applied to the wire as it passes around the sheave 18 and is baked thereto while passing upwardly through the first heated tube 13. Since the composition in the receptacle 14 is extremely adherent to the conductor a single coating thereof is sufficient. Several coatings of the softer insulating composition contained in the receptacle 15 are then applied over the first coating as the wire passes around the sheaves 22, each coating being baked to the desired degree of hardness. Finally two additional coatings of the cellulose acetate solution are applied and baked at a predetermined temperature to a given degree of hardness.

The outer lamination being composed of an inherently hard and resilient insulating composition and baked to a suitable hardness serves as a protective covering or casing for the softer lamination underneath. Furthermore, the lamination of soft insulating material being interposed between two laminations of the relatively hard and resilient material produces a "cushion effect" so to speak, which renders the combination more resistant to abrasion than either material would be by itself.

What is claimed is:

1. A laminated insulation for electrical conductors comprising a baked lamination composed of a cellulose derivative and a synthetic resin, and a baked lamination composed of a solid hydrocarbon and a non-drying vegetable oil.

2. A coating for electrical conductors comprising a plurality of laminations of baked insulating materials, the inner and outer laminations being composed of a hard and adhesive material comprising cellulose acetate and a synthetic resin, and an intermediate lamination being composed of a softer and different material than the first mentioned laminations.

3. A laminated insulation for electrical conductors comprising a baked lamination composed of cellulose acetate and phenolic resin and a baked lamination composed of ozocerite and castor oil.

4. A coating for electrical conductors comprising a plurality of laminations of baked insulating materials, the inner and outer laminations composed of a hard and adhesive material consisting of cellulose acetate and a synthetic resin, and an intermediate lamination composed of a comparatively soft, highly insulating material consisting of ozocerite and castor oil.

5. A laminated insulation for electrical conductors comprising an inner baked coating composed of cellulose acetate and phenolic resin, an intermediate baked coating composed of ozocerite and castor oil, and a hard outer baked coating composed of cellulose acetate and phenolic resin.

6. A laminated insulation for electrical conductors comprising a single adhesive inner baked coating composed of cellulose acetate and phenolic resin, a plurality of soft intermediate baked coatings composed of ozocerite and castor oil, and a plurality of hard, adhesive outer baked coatings composed of cellulose acetate and phenolic resin.

In witness whereof, I hereunto subscribe my name this 16th day of June A. D., 1925.

GEORGE LEROY SCHNABLE.